United States Patent
Liu et al.

(10) Patent No.: US 12,360,631 B2
(45) Date of Patent: *Jul. 15, 2025

(54) TOUCH DETECTING METHOD AND TOUCH DETECTING DEVICE

(71) Applicant: Wacom Co., Ltd., Saitama (JP)

(72) Inventors: Jui Min Liu, Saitama (JP); Shigeyuki Sano, Saitama (JP); Yuhi Hatano, Saitama (JP)

(73) Assignee: Wacom Co., Ltd., Saitama (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/655,155

(22) Filed: May 3, 2024

(65) Prior Publication Data

US 2024/0302920 A1    Sep. 12, 2024

Related U.S. Application Data

(63) Continuation of application No. 17/694,193, filed on Mar. 14, 2022, now Pat. No. 12,019,826, which is a
(Continued)

(51) Int. Cl.
*G06F 3/044* (2006.01)
*G06F 3/0354* (2013.01)
*G06F 3/041* (2006.01)

(52) U.S. Cl.
CPC .... *G06F 3/041661* (2019.05); *G06F 3/03545* (2013.01); *G06F 3/04182* (2019.05); *G06F 3/0446* (2019.05)

(58) Field of Classification Search
CPC ........ G06F 3/041; G06F 3/044; G06F 3/0354; G06F 3/0446; G06F 3/03545; G06F 3/04182; G06F 3/041661
See application file for complete search history.

(56) References Cited

U.S. PATENT DOCUMENTS 9,569,045 B2 * 2/2017 Westerman ......... G06F 3/04186
10,152,184 B2    12/2018 Hayashi
(Continued)

FOREIGN PATENT DOCUMENTS

JP    5901870 B1    4/2016

OTHER PUBLICATIONS

International Search Report, mailed Nov. 12, 2019, for International Application No. PCT/JP2019/039965. (2 pages).

*Primary Examiner* — Olga V Merkoulova
(74) *Attorney, Agent, or Firm* — Seed IP Law Group LLP

(57) ABSTRACT

A touch detecting method includes determining a size of a first touch surface area in which each of first capacitances exceeds a first threshold value, and determining that a detected indicator is a stylus or a finger based on a size of the first touch surface area. In response to determining that the detected indicator is the stylus, obtaining second capacitances by processing the first capacitances, and deriving coordinates indicating a stylus position based on a second touch surface area in which each of the second capacitances exceeds a second threshold value larger than the first threshold value. In response to determining that the detected indicator is the finger, deriving coordinates indicating a finger position based on a third touch surface area in which in which each of the first capacitances exceeds a third threshold value larger than the first threshold value.

10 Claims, 8 Drawing Sheets

Related U.S. Application Data continuation of application No. PCT/JP2019/039965, filed on Oct. 10, 2019.

(56) References Cited

U.S. PATENT DOCUMENTS

| | | | |
|---|---|---|---|
| 10,437,358 B2 | 10/2019 | Geaghan et al. | |
| 10,579,198 B2 | 3/2020 | Hayashi | |
| 10,599,268 B2* | 3/2020 | Nathan | G06F 1/3262 |
| 10,606,408 B2* | 3/2020 | Lee | G06F 3/0446 |
| 10,884,564 B2* | 1/2021 | Yoshida | G06K 19/07756 |
| 10,990,224 B2 | 4/2021 | Nomura et al. | |
| 12,019,826 B2* | 6/2024 | Liu | G06F 3/038 |
| 2010/0259504 A1* | 10/2010 | Doi | G06F 3/044 |
| | | | 345/174 |
| 2011/0001708 A1 | 1/2011 | Sleeman | |
| 2011/0074701 A1* | 3/2011 | Dickinson | G06F 3/041 |
| | | | 345/173 |
| 2011/0074731 A1 | 3/2011 | Inoue et al. | |
| 2012/0293453 A1* | 11/2012 | Yamada | G06F 3/04166 |
| | | | 345/174 |
| 2013/0154965 A1 | 6/2013 | Hwang et al. | |
| 2014/0111472 A1* | 4/2014 | Lee | G06F 3/0446 |
| | | | 345/173 |
| 2015/0363043 A1* | 12/2015 | Mikami | G06F 3/0418 |
| | | | 345/174 |
| 2018/0088704 A1* | 3/2018 | Schlegelmilch | G06F 3/0446 |
| 2018/0181255 A1* | 6/2018 | Nomura | G06F 3/0446 |
| 2019/0220132 A1 | 7/2019 | Sugimoto et al. | |
| 2020/0344408 A1* | 10/2020 | Izuoka | G03B 3/00 |

* cited by examiner

FIG. 3A
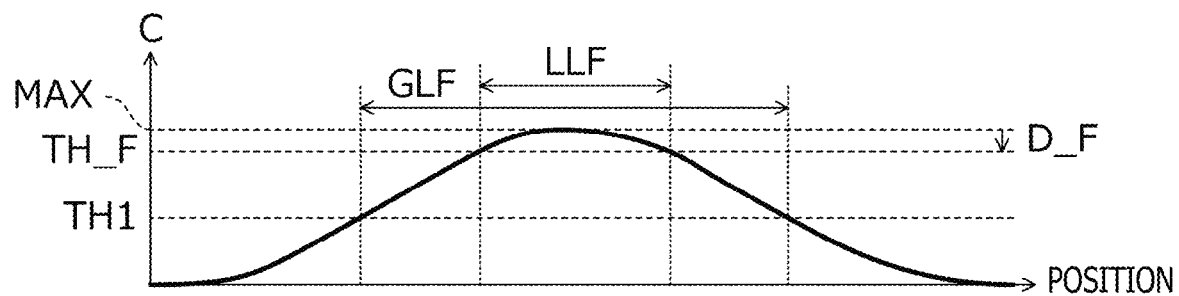
FIG. 3B
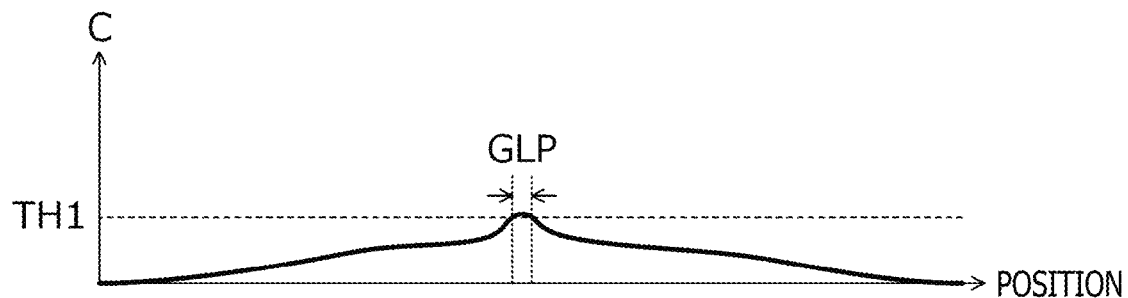
FIG. 4
| 1 | 2 | 1 |
|---|---|---|
| 2 | 4 | 2 |
| 1 | 2 | 1 |
FIG. 5A
| -1 | -1 | -1 |
|----|----|----|
| -1 | 9  | -1 |
| -1 | -1 | -1 |
FIG. 5B
| -1 | 0 | -1 |
|----|---|----|
| -2 | 9 | -2 |
| -1 | 0 | -1 |

| 0 | -1 | 1 | 2 | 0 | -1 | 1 | 3 |
|---|---|---|---|---|---|---|---|
| 0 | 0 | 1 | 3 | 0 | -1 | 1 | 2 |
| 0 | -1 | 0 | 2 | 0 | 0 | 1 | 2 |
| 0 | -1 | -1 | -3 | -9 | -9 | -6 | -2 |
| 0 | -1 | -7 | -19 | -6 | 12 | -7 | -20 |
| -3 | -5 | -20 | -26 | 61 | 139 | 56 | -30 |
| -5 | -8 | -28 | -22 | 116 | 229 | 108 | -28 |
| -2 | -4 | -18 | -23 | 56 | 127 | 49 | -31 |
| 0 | 0 | -4 | -15 | -7 | 6 | -12 | -20 |
| 0 | 0 | 0 | -2 | -8 | -11 | -9 | -3 |
| 0 | 0 | 0 | 0 | -1 | -2 | 0 | 2 |

| 0 | 1 | 0 | 0 | 0 | 0 | 0 | 0 |
|---|---|---|---|---|---|---|---|
| 0 | 0 | 0 | 0 | 0 | 0 | 0 | 0 |
| -1 | 1 | 1 | 0 | 0 | 0 | 0 | 0 |
| -1 | 1 | 1 | 0 | 0 | 0 | 0 | 0 |
| 0 | 0 | 0 | -1 | 0 | 1 | 0 | -1 |
| 0 | 0 | 0 | -2 | 3 | 9 | 2 | -2 |
| 0 | 0 | 0 | -2 | 8 | 19 | 7 | -2 |
| 0 | 0 | 0 | -1 | 4 | 10 | 3 | -1 |
| -1 | 0 | 0 | 0 | 0 | 0 | 0 | 0 |
| 0 | 0 | 0 | 0 | 0 | 0 | 0 | 1 |
| 0 | 0 | 0 | 0 | 0 | 0 | 0 | 0 |

Y ↑ → X

| 0.13 | 0.25 | 0.13 | 0 | 0 | 0 | 0 | 0 |
|---|---|---|---|---|---|---|---|
| 0 | 0.25 | 0.25 | 0.06 | 0 | 0 | 0 | 0 |
| -0.2 | 0.38 | 0.56 | 0.19 | 0 | 0 | 0 | 0 |
| -0.2 | 0.38 | 0.5 | 0.06 | 0 | 0.13 | 0 | -0.1 |
| -0.1 | 0.13 | -0.1 | -0.3 | 0.81 | 1.69 | 0.69 | -0.4 |
| 0 | 0 | -0.4 | 0 | 3.69 | 6.31 | 3.31 | -0.2 |
| 0 | 0 | -0.4 | 0.56 | 6 | 9.75 | 5.5 | 0.31 |
| -0.1 | -0.1 | -0.3 | 0.5 | 4.19 | 6.69 | 3.81 | 0.31 |
| -0.3 | -0.1 | -0.1 | 0.13 | 1.06 | 1.69 | 1 | 0.19 |
| -0.1 | -0.1 | 0 | 0 | 0 | 0 | 0.13 | 0.25 |
| 0 | 0 | 0 | 0 | 0 | 0 | 0.06 | 0.13 |

Y ↑ → X

| 0 | 2 | 0 | -1 | 0 | 0 | 0 | 0 |
|---|---|---|---|---|---|---|---|
| -1 | 1 | 1 | -1 | 0 | 0 | 0 | 0 |
| -3 | 2 | 3 | 0 | -1 | 0 | 0 | 0 |
| -3 | 3 | 3 | -2 | -2 | 0 | -1 | -2 |
| -1 | 2 | -1 | -8 | -2 | 5 | -3 | -8 |
| 0 | 1 | -4 | -13 | 9 | 30 | 6 | -15 |
| 0 | 2 | -6 | -13 | 20 | 50 | 16 | -15 |
| -1 | 1 | -4 | -10 | 11 | 31 | 8 | -11 |
| -2 | 0 | -1 | -5 | -1 | 3 | -2 | -4 |
| -1 | 0 | 0 | -1 | -2 | -2 | -1 | 1 |
| 0 | 0 | 0 | 0 | 0 | 0 | 0 | 1 |

Y↑ →X

TOUCH DETECTING METHOD AND TOUCH DETECTING DEVICE

BACKGROUND

Technical Field

The present disclosure relates to a touch detecting method and a touch detecting device.

Description of the Related Art

A capacitive type touch detecting device includes a touch sensor in which a plurality of X-electrodes each extending in a Y-direction and a plurality of Y-electrodes each extending in an X-direction are arranged so as to intersect each other. The touch detecting device is configured to repeat, for all of the Y-electrodes in order, processing of, for example, inputting a predetermined signal to a Y-electrode and extracting this signal from each X-electrode in order. When an indicator such as a finger, or a stylus approaches a touch surface, a capacitance occurs between the indicator and an X-electrode and a Y-electrode present in the vicinity of the indicator, and a part of a current flowing in the X-electrode through the capacitance is absorbed in the direction of the indicator. Thus, the amplitude of the signal extracted from the X-electrode is decreased. The touch detecting device is configured to detect a capacitance at each coordinate from a change in the amplitude, and derive, as position coordinates of the indicator, coordinates indicating a center of gravity of a region in which the detected capacitance is equal to or more than a threshold value.

U.S. Patent Publication No. 2011/0001708 (hereinafter, Patent Document 1) discloses an example of a capacitive type touch detecting device. When the touch detecting device according to the present example detects a first touch, the touch detecting device first determines, using a first threshold value, which of the finger and the stylus is touching. Then, a detection mode as a function of a determination result is entered which detection mode includes a mode in which a subsequent touch is interpreted with a second threshold value lower than the first threshold value. With regard to this second threshold value, paragraph [0025] of Patent Document 1 describes using a threshold value lower than the first threshold value in a case where the stylus is touching. On the other hand, paragraph [0028] of Patent Document 1 describes using a threshold value lower than the first threshold value in a case where conversely the finger is touching.

However, a technology described in the foregoing Patent Document 1 may not be able to detect the finger and the stylus suitably. Detailed description will be made in the following.

First, supposing that the second threshold value lower than the first threshold value is used to detect the finger, a maximum value of capacitances in the case of the finger is a rather large value in comparison with the first threshold value, and therefore an area detected with the second threshold value (region in which capacitances exceed the second threshold value) is extensive. Then, a difference between coordinates indicating the center of gravity of the area and an original position indicated by the stylus is increased, so that it becomes difficult to detect the finger suitably.

Next, in the case of using the second threshold value lower than the first threshold value for the stylus, changes in capacitances due to approaching or touching of the touch surface by the stylus are very small, and it is therefore difficult, in the first place, to detect the position of the stylus accurately based on the threshold value determination on the capacitances. Hence, it is difficult to detect the stylus suitably even when the second threshold value lower than the first threshold value is used.

BRIEF SUMMARY

It is accordingly one object of the present disclosure to provide a touch detecting method and a touch detecting device that can suitably detect a finger and a stylus.

A touch detecting method according to the present disclosure is a touch detecting method performed by a touch detecting device connected to a touch sensor constituting a touch surface. The touch detecting method includes determining a kind of a detected indicator based on a first area on the touch surface, the first area being an area in which each of a plurality of first capacitances corresponding to a plurality of coordinates on the touch surface exceeds a first threshold value, obtaining a plurality of second capacitances formed by emphasizing a peak in comparison with the plurality of first capacitances by processing the plurality of first capacitances by a first filter in a case where the determining determines that the detected indicator is a stylus, deriving coordinates indicating a position of the stylus on the touch surface based on a second area on the touch surface, the second area being an area in which each of the plurality of second capacitances exceeds a second threshold value larger than the first threshold value, and deriving coordinates indicating a position of a finger on the touch surface based on a third area on the touch surface, the third area being an area in which each of the plurality of first capacitances exceeds a third threshold value larger than the first threshold value, in a case where the determining determines that the detected indicator is the finger.

A touch detecting device according to the present disclosure is a touch detecting device connected to a touch sensor constituting a touch surface. The touch detecting device includes an analog to digital converter which, in operation, generates a digital signal based on an analog signal received from the touch sensor; and a touch detecting circuit coupled to the analog to digital converter. The touch detecting circuit, in operation, determines a kind of a detected indicator based on a first area on the touch surface, the first area being an area in which each of a plurality of first capacitances corresponding to a plurality of coordinates on the touch surface exceeds a first threshold value; obtains a plurality of second capacitances formed by emphasizing a peak in comparison with the plurality of first capacitances by processing the plurality of first capacitances by a first filter in a case where the detected indicator is determined to be a stylus; derives coordinates indicating a position of the stylus on the touch surface based on a second area on the touch surface, the second area being an area in which each of the plurality of second capacitances exceeds a second threshold value larger than the first threshold value; and derives coordinates indicating a position of a finger on the touch surface based on a third area on the touch surface, the third area being an area in which each of the plurality of first capacitances exceeds a third threshold value larger than the first threshold value, in a case where the detected indicator is determined to be the finger.

According to the present disclosure, it is possible to detect a finger and a stylus suitably.

BRIEF DESCRIPTION OF THE SEVERAL VIEWS OF THE DRAWINGS

FIG. 3A is a schematic diagram depicting a distribution of capacitances in a case where a finger is present on a touch surface, and FIG. 3B is a schematic diagram depicting a distribution of capacitances in a case where a stylus is present on the touch surface;

FIG. 4 is a diagram depicting an example of a Gaussian filter used at S6 in FIG. 2;

FIGS. 5A and 5B are each a diagram depicting an example of a high-pass filter used at S7 in FIG. 2;

DETAILED DESCRIPTION

An embodiment of the present disclosure will hereinafter be described in detail with reference to the accompanying drawings.

Figure 1:
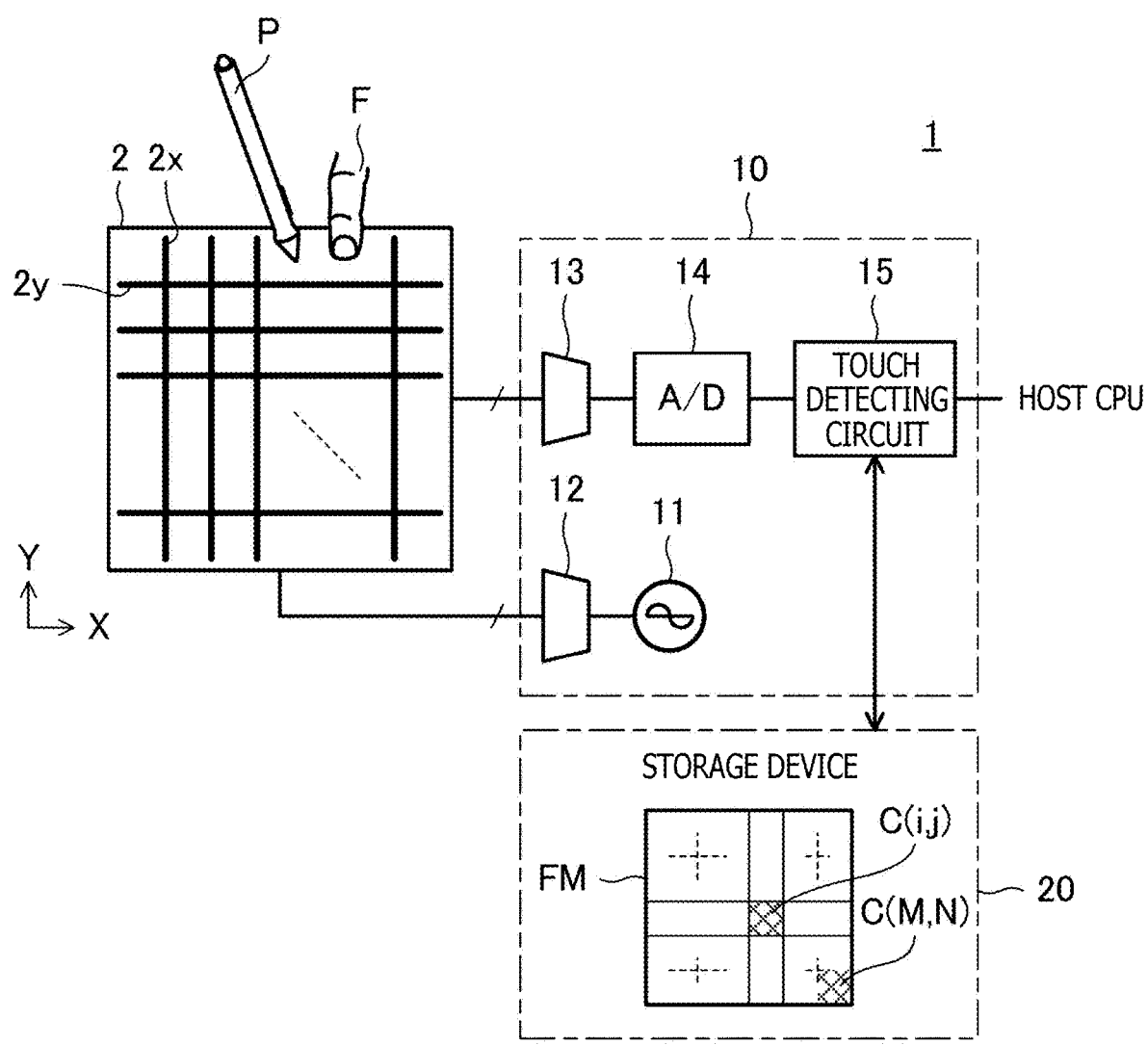
FIG. 1 is a schematic block diagram depicting functional blocks of a touch detecting device according to an embodiment of the present disclosure.

FIG. 1 is a schematic block diagram depicting functional blocks of a touch detecting device 1 according to the present embodiment. As depicted in the figure, the touch detecting device 1 includes a touch sensor 2, a touch sensor controller 10, a storage device 20, and a host central processing unit (CPU). A touch detecting method according to the present embodiment is performed by the touch sensor controller 10 among these constituent elements.

The touch sensor 2 is a device for detecting touch operation by a finger F or a stylus P. The touch sensor 2 is, for example, disposed on the display surface of a display device not depicted. The display device is a device that displays text and images under control of the host CPU. A liquid crystal display or an organic electroluminescence (EL) display, for example, can be suitably used as the display device. The upper surface of the touch sensor 2 forms a flat surface and constitutes the touch surface of the touch detecting device 1. It is to be noted that the present disclosure is not limited to the touch detecting device 1 having the display function but is also applicable to touch detecting devices not having the display function such as digitizers.

The touch sensor 2 is, specifically, a capacitive type touch sensor. As depicted in FIG. 1, the touch sensor 2 has a configuration in which a plurality of X-electrodes $2x$ each extending in a Y-direction and arranged at equal intervals in an X-direction and a plurality of Y-electrodes $2y$ each extending in the X-direction and arranged at equal intervals in the Y-direction are arranged so as to intersect each other. The X-electrodes $2x$ and the Y-electrodes $2y$ constitute sensor electrodes of the touch sensor 2. The X-electrodes $2x$ and the Y-electrodes $2y$ are each formed by a transparent conductive material such as an indium tin oxide (ITO) transparent conductive film. A user of the touch detecting device 1 can therefore view the display surface of the display device through the touch surface. When the finger F or the stylus P comes into contact with the touch surface, a capacitance occurs between the finger F and X-electrodes $2x$ and Y-electrodes $2y$ in the vicinity of the finger F. The touch sensor controller 10 is configured to detect the position of the finger F or the stylus P on the touch surface by using this change in capacitance. This will be described later again in more detail.

As depicted in FIG. 1, the touch sensor controller 10 includes an oscillator 11, multiplexers 12 and 13, an analog to digital (A/D) converter 14, and a touch detecting circuit 15.

The oscillator 11 is a circuit that oscillates a signal of a predetermined frequency. In addition, the multiplexer 12 is a circuit that plays a role of selecting the plurality of X-electrodes $2x$ one by one in order at predetermined time intervals and connecting the oscillator 11 to the selected X-electrodes $2x$. Due to an action of the multiplexer 12, a signal output by the oscillator 11 is supplied to each of the plurality of X-electrodes $2x$ in order. The signal supplied to the X-electrode $2x$ is supplied to each Y-electrode $2y$ through an intersection position (i, j) of the X-electrode $2x$ and each Y-electrode $2y$. Here, i and j are respectively natural numbers indicating serial numbers of the X-electrodes $2x$ and the Y-electrodes $2y$. A combination (i, j) of i and j represents the coordinates of each intersection position on the touch surface. Respective maximum values of i and j are M and N, as depicted in FIG. 1.

The multiplexer 13 is a circuit that plays a role of selecting the plurality of Y-electrodes $2y$ one by one in order at predetermined time intervals and connecting the selected Y-electrodes $2y$ to an input terminal of the analog to digital converter 14. The analog to digital converter 14 has a function of generating a digital signal by subjecting the signal supplied from each Y-electrode $2y$ to sampling and quantization and supplying the generated digital signal to the touch detecting circuit 15.

When the finger F or the stylus P is in proximity to a certain intersection position (i, j), a capacitance occurs between an X-electrode $2x$ and a Y-electrode $2y$ in the vicinity of the intersection position (i, j) and the finger F or the stylus P, and the signal is absorbed in the direction of a human body. As a result, the amplitude of the signal supplied from the Y-electrode $2y$ to the analog to digital converter 14 is decreased, which is reflected in the value of the digital signal. The touch detecting circuit 15 is configured to detect a capacitance C (i, j) (first capacitance) between the finger F or the stylus P and the touch sensor 2 for each intersection position (i, j) based on a change in the amplitude which change is thus reflected in the value of the digital signal, and write the capacitance to a frame memory FM in the storage device 20. Incidentally, as for a concrete configuration of the touch detecting circuit 15, the touch detecting circuit 15 is suitably configured by a hardware circuit such, for example, as a programmable logic controller. However, the touch detecting circuit 15 may be configured by a processor that implements each function to be described later by reading and executing a program stored in a memory not depicted.

By using a plurality of capacitances C written to the frame memory FM, the touch detecting circuit 15 detects the finger F or the stylus P and derives coordinates indicating the position of the detected finger F or the detected stylus P on the touch surface. These pieces of processing will be described in detail in the following.

Figure 2:
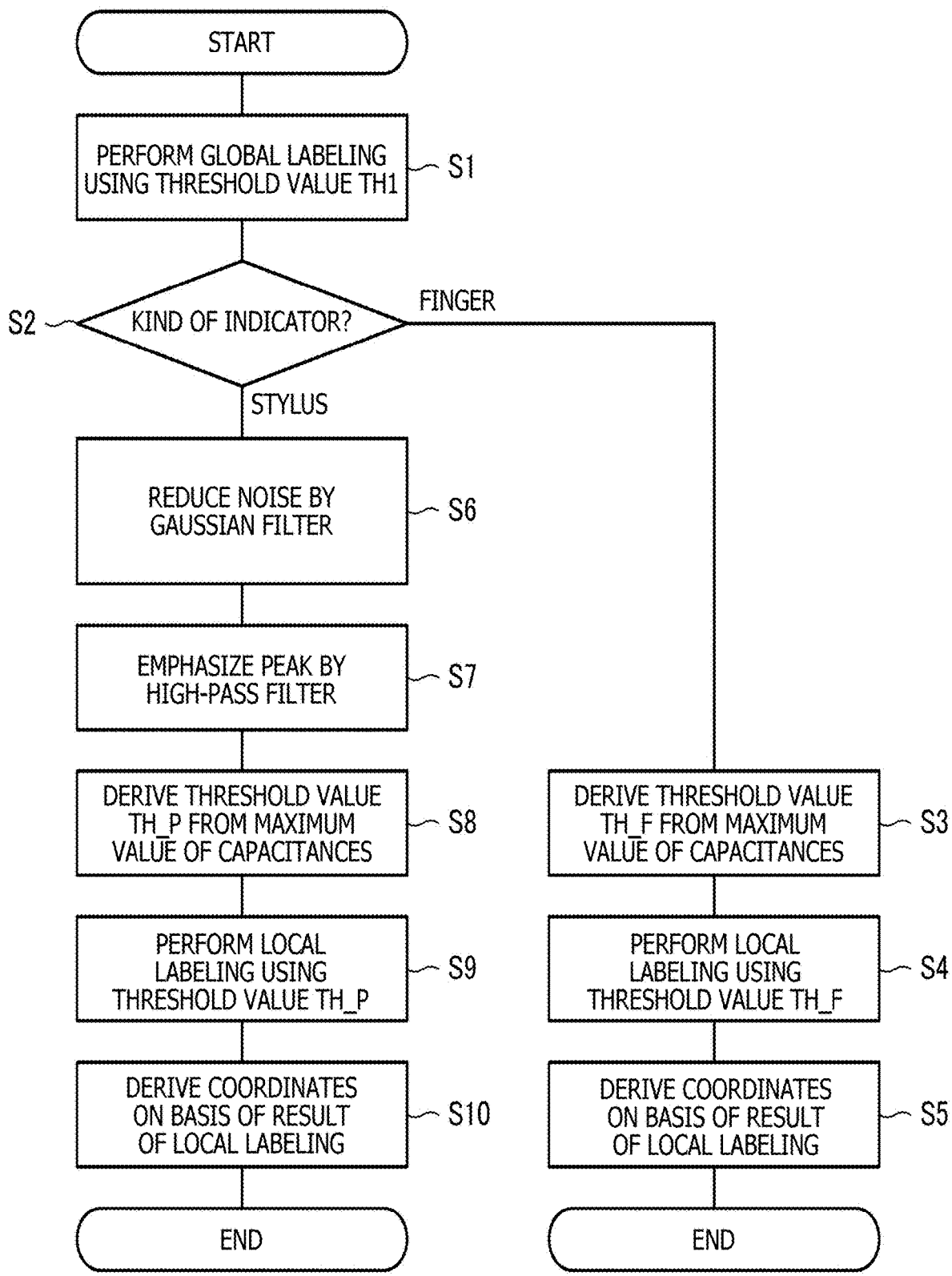
FIG. 2 is a flowchart depicting processing performed by a touch detecting circuit.

FIG. 2 is a flowchart depicting processing performed by the touch detecting circuit 15. The touch detecting circuit 15 is configured to repeat the processing depicted in the figure periodically.

As depicted in FIG. 2, the touch detecting circuit 15 first performs global labeling using a threshold value TH1 (first threshold value) (S1). The global labeling is processing of identifying an area (first area) on the touch surface in which area a plurality of capacitances C exceed the threshold value TH1. The global labeling is performed to determine the kind of a detected indicator.

FIG. 3A is a schematic diagram depicting a distribution of capacitances C in a case where the finger F is present on the touch surface. FIG. 3B is a schematic diagram depicting a distribution of capacitances C in a case where the stylus P is present on the touch surface. As is understood from comparison between these figures, in the case where the finger F is present on the touch surface, a peak value of the capacitances C is increased to a considerable degree as compared with the case where the stylus P is present on the touch surface. Incidentally, the distribution of FIG. 3B has a shape such that a small protruding portion is disposed on a mountain portion having a large spread. Part of the mountain portion is attributable to noise (including noise caused by bending of the touch surface). Part of the protruding portion corresponds to the position of the stylus P.

Figures 7A, 7B:
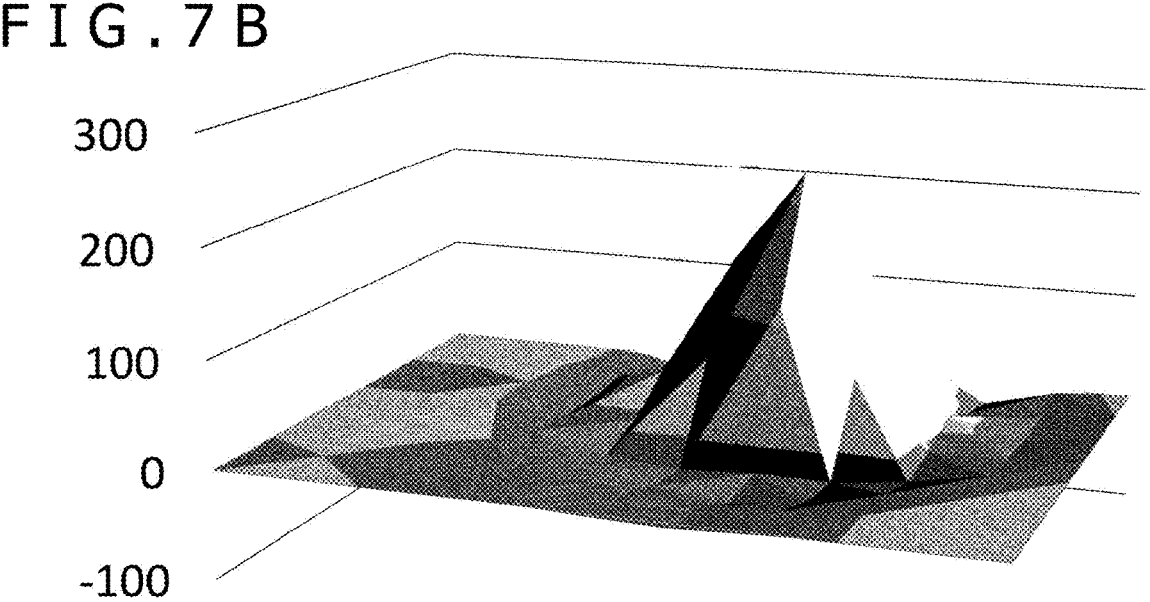
FIG. 7A is a diagram depicting a more concrete example of the capacitances detected in the case where the finger is in contact with the touch surface.
FIG. 7B is a three-dimensional (3D) contour map depicting a distribution of the capacitances depicted in FIG. 7A.
Figures 8A, 8B:
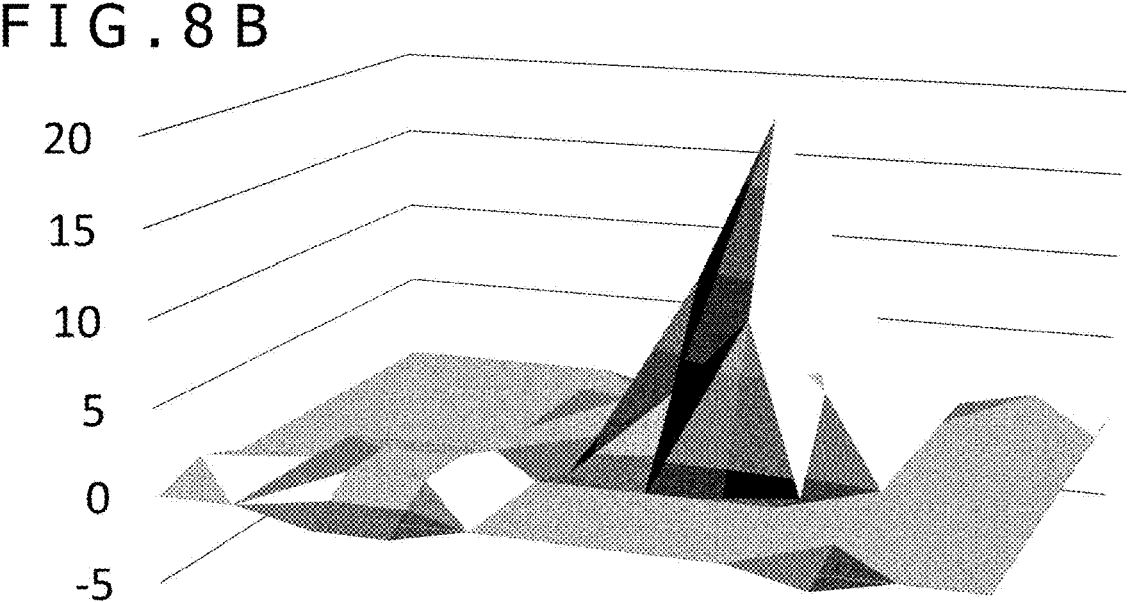
FIG. 8A is a diagram depicting a more concrete example of the capacitances detected in the case where the stylus is in contact with the touch surface.
FIG. 8B is a 3D contour map depicting a distribution of the capacitances depicted in FIG. 8A.

FIG. 7A is a diagram depicting a more concrete example of the capacitances C detected in the case where the finger F is in contact with the touch surface. FIG. 7B is a 3D contour map depicting a distribution of the capacitances C depicted in FIG. 7A. In addition, FIG. 8A is a diagram depicting a more concrete example of the capacitances C detected in the case where the stylus P is in contact with the touch surface. FIG. 8B is a 3D contour map depicting a distribution of the capacitances C depicted in FIG. 8A. It is understood also from these figures that in the case where the finger F is present on the touch surface, the peak value of the capacitances C is increased to a considerable degree as compared with the case where the stylus P is present on the touch surface. In addition, as is understood by referring also to FIGS. 9A and 9B and FIGS. 10A and 10B to be described later, the distribution of FIGS. 8A and 8B is such that a small protruding portion is disposed on a mountain having a spread.

The description returns to FIG. 3. The threshold value TH1 is set to a value normally expected to be positioned between an upper end and a lower end of the above-described protruding portion. When the threshold value TH1 is set to such a value, as is understood from FIG. 3A and FIG. 3B, the size of an area in which capacitances C exceed the threshold value TH1 is relatively large in the case where the finger F is present on the touch surface (illustrated area GLF), and the size of the area is relatively small in the case where the stylus P is present on the touch surface (illustrated area GLP). Hence, the touch detecting circuit 15 can determine the kind of the detected indicator by calculating the size of the area on the touch surface in which area a plurality of capacitances C exceed the threshold value TH1.

The description returns to FIG. 2. After performing S1, the touch detecting circuit 15 determines the kind of the detected indicator based on the area (the area GLF or the area GLP) identified by the global labeling (S2). When the touch detecting circuit 15 identifies the finger F at S2, the touch detecting circuit 15 derives a threshold value TH_F (third threshold value) for the detection of the finger F from a maximum value of the detected capacitances (S3).

The derivation of the threshold value TH_F will be described with reference to FIG. 3A again. As depicted in the figure, the touch detecting circuit 15 derives the threshold value TH_F=MAX−D_F by subtracting a predetermined value D_F (second value) from a maximum value MAX of the detected capacitances. The value of the predetermined value D_F is determined in advance such that the threshold value TH_F is a value larger than the threshold value TH1.

The description returns to FIG. 2. The touch detecting circuit 15 performs local labeling using the derived threshold value TH_F (S4). The local labeling in this case is processing of identifying an area (third area) on the touch surface in which area capacitances C exceed the threshold value TH_F. An area LLF depicted in FIG. 3A is an example of the thus identified third area. Next, the touch detecting circuit 15 derives coordinates indicating the position of the finger F based on a result of the local labeling (S5). In a concrete example, the touch detecting circuit 15 derives the center of gravity of the third area as the coordinates indicating the position of the finger F. The touch detecting circuit 15 outputs the derived coordinates indicating the position of the finger F to the host CPU (see FIG. 2). The touch detecting circuit 15 then ends the processing.

When the touch detecting circuit 15 identifies the stylus P at S2, the touch detecting circuit 15 first performs processing of reducing noise included in the plurality of capacitances C by processing the detected plurality of capacitances by a predetermined second filter (S6). The second filter is, specifically, a Gaussian filter that smooths the plurality of capacitances C.

FIG. 4 is a diagram depicting an example of the Gaussian filter used at S6. The Gaussian filter according to the present example is a matrix of three rows and three columns. The touch detecting circuit 15 obtains capacitances C1 (i, j) after processing by the Gaussian filter according to the following Equation (1). In Equation (1), m and n are each an integer of 1 to 3, and G (m, n) denotes an element in an mth row and an nth column of the Gaussian filter.

[Equation 1]

$$C1(i, j) = \sum_{m,n=1}^{3} \frac{G(m, n)}{\sum_{m,n=1}^{3} G(m, n)} \times C(i + m - 2, j + n - 2) \quad (1)$$

Figure 6A:
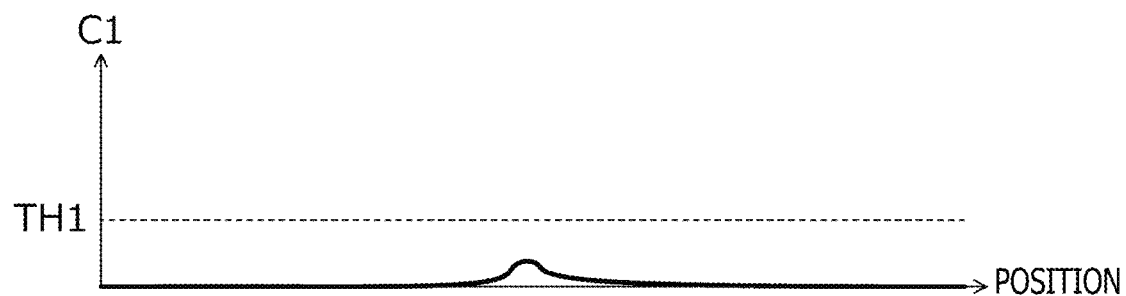
FIG. 6A is a schematic diagram depicting capacitances obtained by processing the capacitances depicted in FIG. 3B by the Gaussian filter depicted in FIG. 4.

FIG. 6A is a schematic diagram depicting the capacitances C1 obtained by processing the capacitances C depicted in FIG. 3B by the Gaussian filter depicted in FIG. 4. As is understood from comparison between FIG. 6A and FIG. 3B, the capacitances C1 are reduced in noise as compared with the capacitances C as a result of the processing by the Gaussian filter.

Figures 9A, 9B:
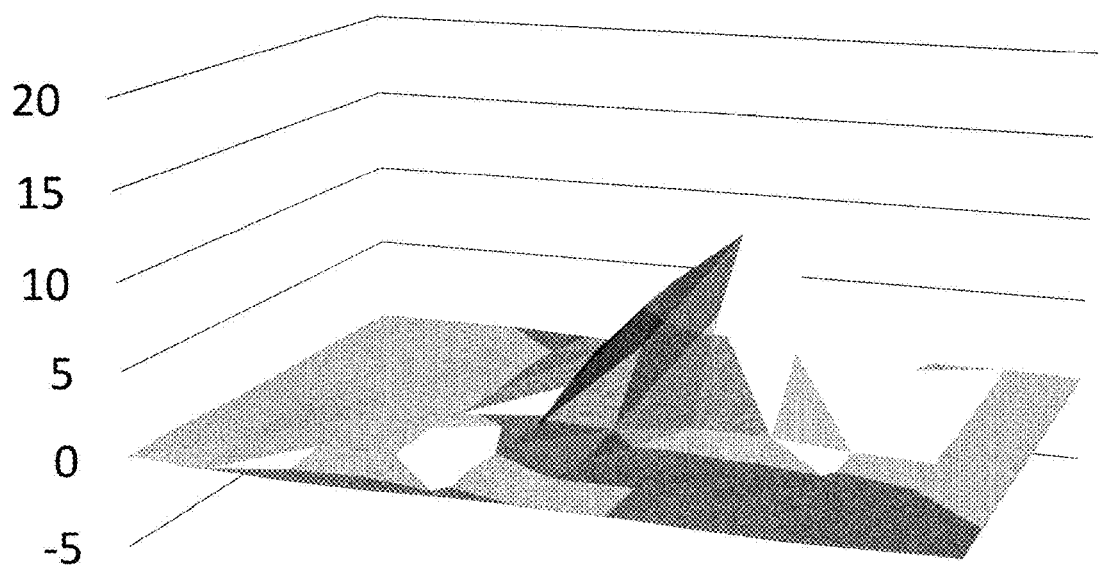
FIG. 9A is a diagram depicting capacitances obtained by processing the capacitances depicted in FIG. 8A by the Gaussian filter of FIG. 4.
FIG. 9B is a 3D contour map depicting a distribution of the capacitances depicted in FIG. 9A.

FIG. 9A is a diagram depicting the capacitances C1 obtained by processing the capacitances C depicted in FIG.

8A by the Gaussian filter of FIG. 4. FIG. 9B is a 3D contour map depicting a distribution of the capacitances C1 depicted in FIG. 9A. It is understood also from comparison between FIGS. 9A and 9B and FIGS. 8A and 8B that noise can be removed from the capacitances C by processing the capacitances C by the Gaussian filter.

The description returns to FIG. 2. After performing S6, the touch detecting circuit 15 next performs processing of emphasizing a peak included in the plurality of capacitances C1 by processing the detected plurality of capacitances C1 by a predetermined first filter (S7). The first filter is, specifically, a high-pass filter that emphasizes changes in the capacitances C1 on the touch surface.

FIGS. 5A and 5B are each a diagram depicting an example of the high-pass filter used at S7. Incidentally, a sequence (0, 9, 0) in a vertical direction and a sequence (−2, 9, −2) in a horizontal direction in the high-pass filter depicted in FIG. 5B are different from each other in order to reduce an effect of the bending of the touch surface. The high-pass filters according to these examples are a matrix of three rows and three columns. The touch detecting circuit 15 obtains capacitances C2 (i, j) (second capacitance) after processing by the high-pass filter according to the following Equation (2). However, in Equation (2), m and n are each an integer of 1 to 3, and H (m, n) denotes each element of the high-pass filter.

[Equation 2]

$$C2(i, j) = \sum_{m,n=1}^{3} H(m, n) \times C1(i + m - 2, j + n - 2) \quad (2)$$

Figure 6B:
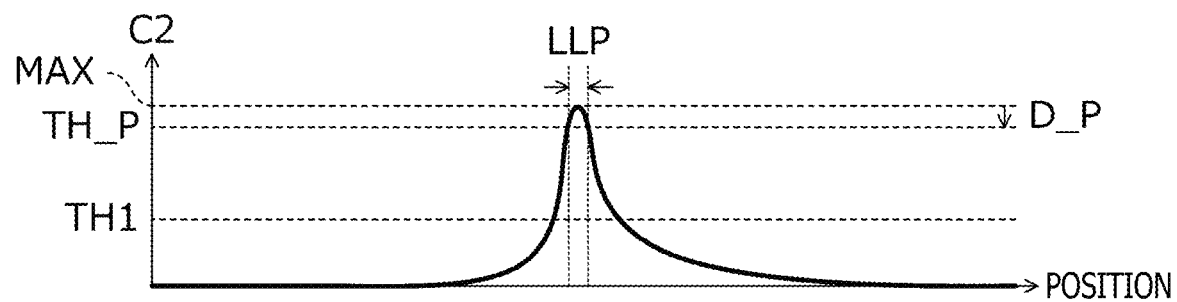
FIG. 6B is a schematic diagram depicting capacitances obtained by processing the capacitances depicted in FIG. 6A by the high-pass filter depicted in FIG. 5A or FIG. 5B.

FIG. 6B is a schematic diagram depicting the capacitances C2 obtained by processing the capacitances C1 depicted in FIG. 6A by the high-pass filter depicted in FIG. 5A or FIG. 5B. As is understood from comparison of FIG. 6B with FIG. 3B and FIG. 6A, a peak of the capacitances C2 is emphasized as a result of the processing by the high-pass filter as compared with the capacitances C and C1.

Figures 10A, 10B:
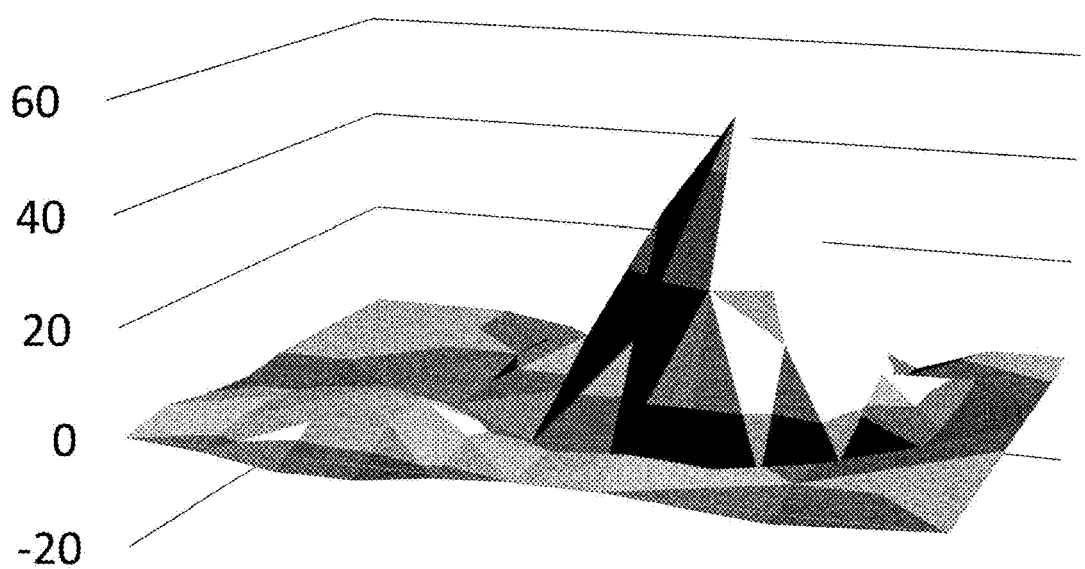
FIG. 10A is a diagram depicting capacitances obtained by processing the capacitances depicted in FIG. 9A by the high-pass filter of FIG. 5B.
FIG. 10B is a 3D contour map depicting a distribution of the capacitances depicted in FIG. 10A.

FIG. 10A is a diagram depicting the capacitances C2 obtained by processing the capacitances C1 depicted in FIG. 9A by the high-pass filter of FIG. 5B. FIG. 10B is a 3D contour map depicting a distribution of the capacitances C2 depicted in FIG. 10A. It is understood also from comparison of FIGS. 10A and 10B with FIGS. 9A and 9B that a peak included in the capacitances C1 can be emphasized by processing the capacitances C1 by the high-pass filter.

The description returns to FIG. 2. After performing S6 and S7, the touch detecting circuit 15 next derives a threshold value TH_P (second threshold value) for the detection of the stylus P from a maximum value of the capacitances C2 (S8).

The derivation of the threshold value TH_P will be described with reference to FIG. 6B again. As depicted in the figure, the touch detecting circuit 15 derives a threshold value TH_P=MAX−D_P by subtracting a predetermined value D_P (first value) from a maximum value MAX of the detected capacitances C2. The value of the predetermined value D_P is determined in advance such that the threshold value TH_P is a value larger than the threshold value TH1. Incidentally, the predetermined value D_P can be set to be a value equal to the predetermined value D_F described above.

The description returns to FIG. 2. The touch detecting circuit 15 performs local labeling using the derived threshold value TH_P (S9). The local labeling in this case is processing of identifying an area (second area) on the touch surface in which area capacitances C2 exceed the threshold value TH_P. An area LLP depicted in FIG. 6B is an example of the thus identified second area. Next, the touch detecting circuit 15 derives coordinates indicating the position of the stylus P based on a result of the local labeling (S10). In a concrete example, the touch detecting circuit 15 derives the center of gravity of the second area as the coordinates indicating the position of the stylus P. The touch detecting circuit 15 outputs the derived coordinates indicating the position of the stylus P to the host CPU (see FIG. 2). The touch detecting circuit 15 then ends the processing.

As described above, according to the touch detecting method and the touch detecting device 1 in accordance with the present embodiment, the finger F is detected using the third threshold value larger than the first threshold value. Thus, the detection of the finger F can be performed suitably. In addition, the stylus P is detected using the second threshold value larger than the first threshold value after the peak is emphasized by a filter. Thus, the detection of the stylus P can also be performed suitably. Hence, according to the touch detecting method and the touch detecting device 1 in accordance with the present embodiment, the detection of the finger F and the stylus P can be performed suitably.

The preferred embodiment of the present disclosure has been described above. However, the present disclosure is not at all limited to such embodiment, but the present disclosure can of course be carried out in various modes without departing from the spirit of the present disclosure.

For example, as described in Japanese Patent No. 5901870, the touch detecting circuit 15 may write, to the frame memory FM, a value formed by subtracting a reference value for each intersection position (i, j) from the capacitance C (i, j) in place of the capacitance C (i, j). Then, as described in the foregoing embodiment, this value written to the frame memory FM may be used to detect the finger F or the stylus P and derive the coordinates indicating the position of the detected finger F or the detected stylus P on the touch surface. It is thereby possible to reduce an effect of bending caused by depression of the touch surface.

In addition, while filters as matrices of three rows and three columns are depicted in FIG. 4 and FIGS. 5A and 5B, other kinds of filters can also be used. Further, while FIG. 2 depicts an example in which the Gaussian filter and the high-pass filter are applied in this order, the high-pass filter may be applied first. Besides, noise reduction by the Gaussian filter may be omitted.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch detecting method performed by a touch detecting device connected to a touch sensor constituting a touch surface, the touch detecting method comprising:

determining a size of a first area on the touch surface, the first area being an area in which each of a plurality of first capacitances corresponding to a plurality of coordinates on the touch surface exceeds a first threshold value;

determining that a detected indicator is a stylus or a finger based on the size of the first area on the touch surface;

in response to determining that the detected indicator is the stylus based on the size of the first area on the touch surface:

obtaining a plurality of second capacitances formed by emphasizing a peak in comparison with the plurality of first capacitances by processing the plurality of first capacitances by a first filter; and deriving coordinates indicating a position of the stylus on the touch surface based on a second area on the touch surface, the second area being an area in which each of the plurality of second capacitances exceeds a second threshold value that is larger than the first threshold value; and in response to determining that the detected indicator is the finger based on the size of the first area on the touch surface:

deriving coordinates indicating a position of the finger on the touch surface based on a third area on the touch surface, the third area being an area in which each of the plurality of first capacitances exceeds a third threshold value larger than the first threshold value, wherein the obtaining the plurality of second capacitances includes obtaining the plurality of second capacitances formed by emphasizing the peak in comparison with the plurality of first capacitances and reducing noise in comparison with the plurality of first capacitances, by processing the plurality of first capacitances by each of the first filter and a second filter, wherein the obtaining the plurality of second capacitances includes processing the plurality of first capacitances by the first filter, and processing, by the second filter, the plurality of first capacitances after being processed by the first filter, wherein the first filter is a high-pass filter that emphasizes changes in the plurality of first capacitances on the touch surface, and wherein the second filter is a Gaussian filter that smooths the plurality of first capacitances after being processed by the first filter.

2. The touch detecting method according to claim 1, further comprising:

deriving the second threshold value by subtracting a predetermined first value from a maximum value of the plurality of second capacitances within the first area.

3. The touch detecting method according to claim 2, further comprising:

deriving the third threshold value by subtracting a predetermined second value from a maximum value of the plurality of first capacitances within the first area.

4. The touch detecting method according to claim 3, wherein the predetermined first value and the predetermined second value are equal to each other.

5. The touch detecting method according to claim 1, wherein:

the obtaining the plurality of second capacitances includes processing, by the second filter, the plurality of first capacitances, and processing, by the first filter, the plurality of first capacitances after being processed by the second filter, the second filter is a Gaussian filter that smooths the plurality of first capacitances, and the first filter is a high-pass filter that emphasizes changes in the plurality of first capacitances after being processed by the second filter within the touch surface.

6. A touch detecting device connected to a touch sensor constituting a touch surface, the touch detecting device comprising:

an analog to digital converter which, in operation, generates a digital signal based on an analog signal received from the touch sensor; and a touch detecting circuit coupled to the analog to digital converter, wherein the touch detecting circuit, in operation, determines a size of a first area on the touch surface, the first area being an area in which each of a plurality of first capacitances corresponding to a plurality of coordinates on the touch surface exceeds a first threshold value;

determines that a detected indicator is a stylus or a finger based on the size of the first area on the touch surface;

in a case where the detected indicator is determined to be the stylus based on the size of the first area on the touch surface:

obtains a plurality of second capacitances formed by emphasizing a peak in comparison with the plurality of first capacitances by processing the plurality of first capacitances by a first filter; and derives coordinates indicating a position of the stylus on the touch surface based on a second area on the touch surface, the second area being an area in which each of the plurality of second capacitances exceeds a second threshold value larger than the first threshold value; and in a case where the detected indicator is determined to be the finger based on the size of the first area on the touch surface:

derives coordinates indicating a position of the finger on the touch surface based on a third area on the touch surface, the third area being an area in which each of the plurality of first capacitances exceeds a third threshold value larger than the first threshold value, wherein the touch detecting circuit, in operation, obtains the plurality of second capacitances by obtaining the plurality of second capacitances formed by emphasizing the peak in comparison with the plurality of first capacitances and reducing noise in comparison with the plurality of first capacitances, by processing the plurality of first capacitances by each of the first filter and a second filter, wherein the touch detecting circuit, in operation, obtains the plurality of second capacitances by processing, by the first filter, the plurality of first capacitances, and processing, by the second filter, the plurality of first capacitances after being processed by the first filter, wherein the first filter is a high-pass filter that emphasizes changes in the plurality of first capacitances on the touch surface, and wherein the second filter is a Gaussian filter that smooths the plurality of first capacitances after being processed by the first filter.

7. The touch detecting device according to claim 6, wherein the touch detecting circuit, in operation, derives the second threshold value by subtracting a predetermined first value from a maximum value of the plurality of second capacitances within the first area.

8. The touch detecting device according to claim 7, wherein the touch detecting circuit, in operation, derives the third threshold value by subtracting a predetermined second value from a maximum value of the plurality of first capacitances within the first area.

9. The touch detecting device according to claim 8, wherein the first value and the second value are equal to each other.

10. The touch detecting device according to claim 6, wherein:
the touch detecting circuit, in operation, obtains the plurality of second capacitances by processing the plurality of first capacitances by the second filter, and processing, by the first filter, the plurality of first capacitances after being processed by the second filter,
the second filter is a Gaussian filter that smooths the plurality of first capacitances, and
the first filter is a high-pass filter that emphasizes changes in the plurality of first capacitances after being processed by the second filter within the touch surface.

* * * * *